A. DE VILBISS, Jr.
CHEESE CUTTER.
APPLICATION FILED AUG. 29, 1904.
932,540.
Patented Aug. 31, 1909.
2 SHEETS—SHEET 1.
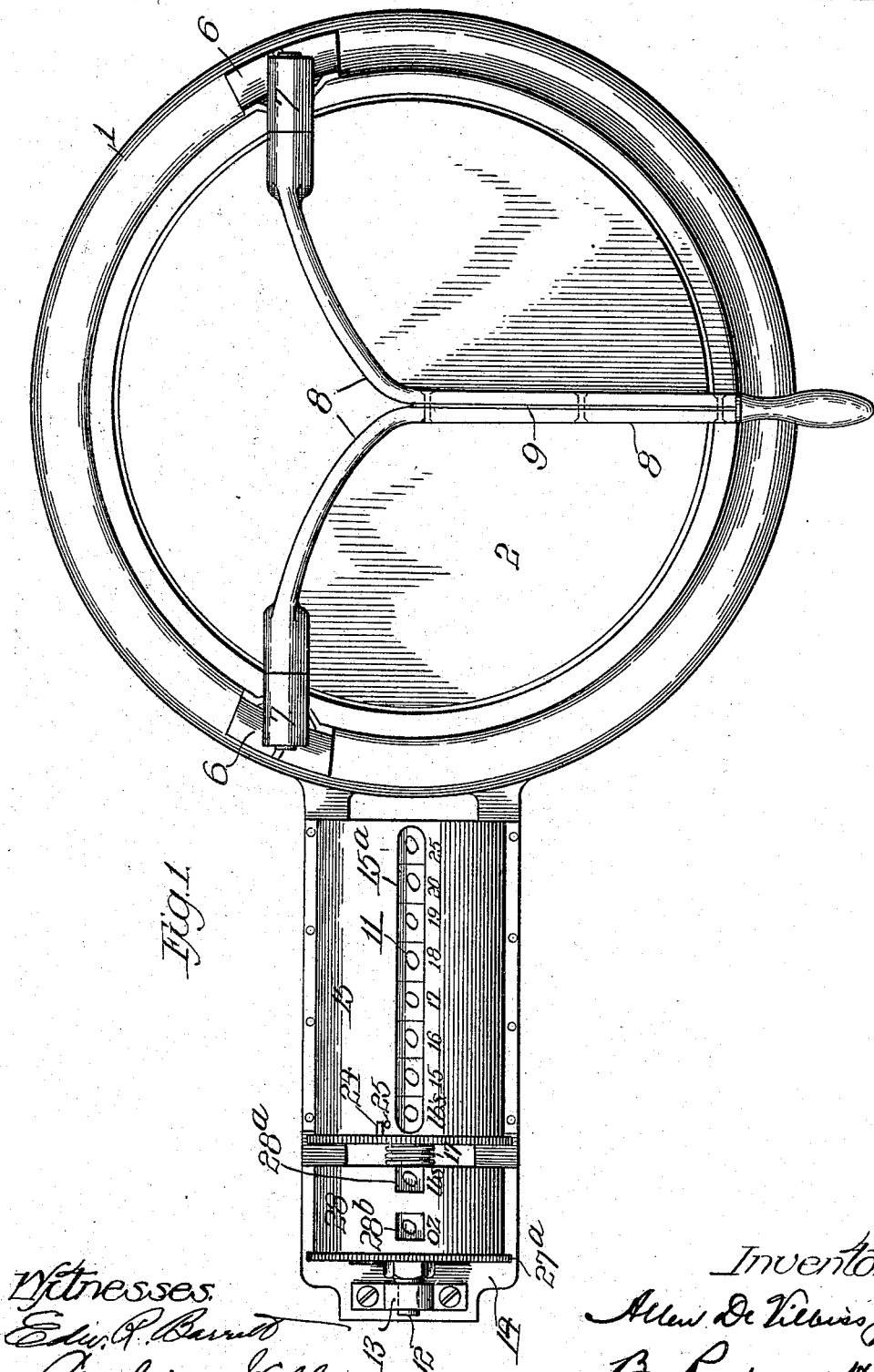

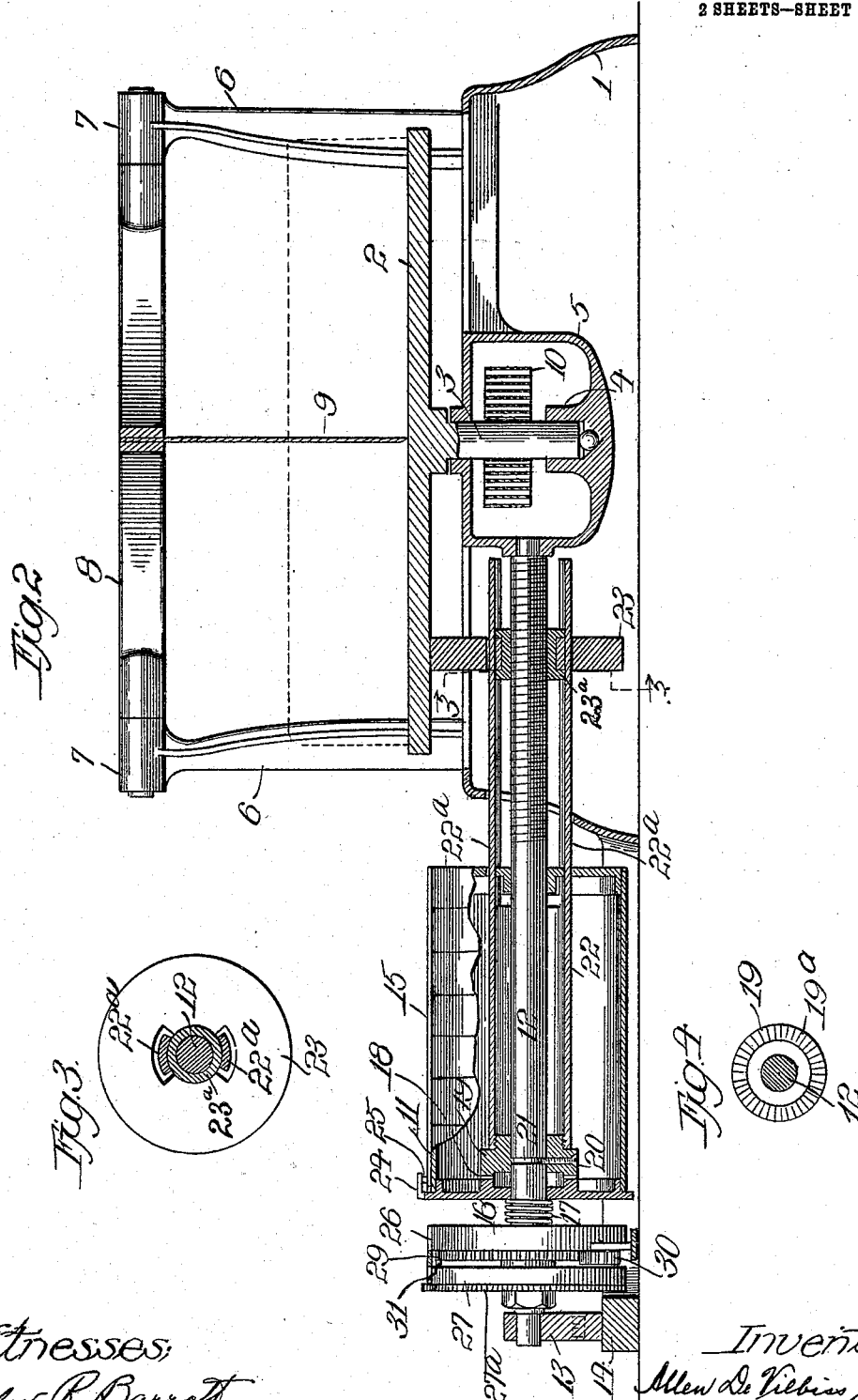

UNITED STATES PATENT OFFICE.

ALLEN DE VILBISS, JR., OF TOLEDO, OHIO, ASSIGNOR TO THE TOLEDO COMPUTING SCALE COMPANY, OF NEWARK, NEW JERSEY, A CORPORATION OF NEW JERSEY.

CHEESE-CUTTER.

932,540.  Specification of Letters Patent.  Patented Aug. 31, 1909.

Application filed August 29, 1904. Serial No. 222,571.

*To all whom it may concern:*

Be it known that I, ALLEN DE VILBISS, Jr., of Toledo, Lucas county, Ohio, have invented certain new and useful Improvements in Cheese-Cutters, of which the following is a specification.

My invention relates to a cheese cutter so constructed and operating that a piece of cheese of any predetermined weight or of any predetermined value may be cut with great exactness from a wheel of cheese, such cut piece corresponding in weight or in value to the weight or value called for by the customer. In the present instance, the wheel of cheese is mounted on a rotatable table or support whose movement or degree of movement is automatically controlled by mechanism, in the nature of indicating and weighing mechanism and capable of being so adjusted that the wheel of cheese will be turned a predetermined distance to present more or less of the cheese to be cut off by a knife, according to the weight or value desired.

In the drawings Figure 1 is a plan view of my cheese cutter; Fig. 2 a central longitudinal section of such cutter; Fig. 3 a section on the line 3 of Fig. 2, and Fig. 4 a detail view of one of the ratchet surfaces of the controlling mechanism.

Referring to the particular embodiment of my invention as disclosed herein, the cheese cutter or machine comprises a hollow base 1 upon which is supported to rotate a platform or table 2 arranged to receive and support the wheel of cheese. In the present instance, this platform is supported on a central depending spindle 3 which extends into an end bearing 4 arranged in the bottom of a spring case 5 formed on the interior of the base. This bearing contains a ball upon which the lower end of the spindle bears so that the friction will be reduced to a minimum.

From the base 1 at a point beyond the edge of the platform rise two posts or supports 6 provided with bearings 7 extending inwardly and arranged to receive the trunnions of the two branches of the cheese knife which consists of the knife frame 8 (bifurcated as shown) and the knife blade 9. The bearings 7 are not arranged diametrically of the platform but on a line parallel to a diameter thereof, with the result that the knife blade is on a radius of the platform and is thereby adapted to cut said wheel of cheese radially.

The cheese platform is constantly under tension adapted to rotate or turn it in one direction, and in the present instance such tension is applied thereto by means of a coiled spring 10 contained within the spring case 5 and connected respectively to the case and to the spindle 3 of the platform. The platform and the wheel of cheese thereon is normally restrained against the spring pressure or tension by means of the knife which in normal position, as indicated in Fig. 2, constitutes a stop for such platform. When, however, the knife is raised so as to clear the cheese, thereby removing such restraint, the platform will be turned or partially rotated a certain distance as predetermined and controlled by the mechanism hereinafter described, with the result that the uncut portion of the cheese will be brought below the knife and more or less of such cheese will be presented to the knife, according to the degree of movement permitted by said mechanism. When the knife is depressed the particular piece of cheese thus cut off will be found to correspond in weight or value to the weight or value to which said mechanism had been set or adjusted by the salesman.

As herein shown, the means for controlling the movement of the cheese platform consists of what may be termed computing or weight mechanism, which is adjusted by the salesman to a certain position according to the weight or value of the cut of cheese desired. Provision is also made for the accurate cutting of wheels of cheese of different weights, it being obvious that different weights of wheels require varying amounts of movement of the cheese platform for a given weight of cut. In the present instance an indicating drum or cylinder 11, bearing weight and price indications of well known character found in so-called cylinder or barrel scales, is arranged at one side of the base of the cheese platform and mounted to rotate on a screw shaft 12. This shaft is positioned horizontally with its inner end bearing in the wall of the spring case 5 and its outer end in a post or bearing support 13 rising from the extension 14 of the main frame or base on the left hand side of the latter, according to the construction now being described. A fixed casing 15 fits over the indicating drum or cylinder and is secured at its lower edges to the extension 14 of the base, see Fig. 1, or otherwise held in place. The indicating cylinder has at its outer end a head 16 which, together with such cylinder, to which it is secured, has a movement longitudinally of the screw shaft 12 against the tension of the spring 17. To enable this head and drum to be readily and conveniently manipulated by the salesman in the adjustments hereinafter explained, the edge or periphery of the head is provided with a knurled flange. The end head 16 has on its inner side a ratchet surface 18 adapted to engage a corresponding ratchet surface 19ª on a collar or sleeve 19, which ratchet surfaces are normally held together in engagement or operative relation by means of the spring 17 hereinbefore referred to. This collar is suitably mounted upon the shaft 12 and is secured thereto against longitudinal movement but not against rotary movement by means of the set screw 20 passing through such collar and entering a circumferential groove 21 in such shaft. A tube 22 concentric with the shaft 12 is secured to the collar as illustrated in Fig. 2, but its inner or right hand end is made in the form of two arms 22ª extending toward the spring case 5.

In the present instance the operating connection between the cheese platform 2 and the computing or indicating devices by which the movements or degree of movement of such platform are controlled, consists of a wheel 23 which, by reason of its frictional engagement with such platform, may be termed a friction wheel. The collar 19 and the tube 22 serve to operatively connect such wheel with the indicating devices and to this end the arms 22ª of the tube 22 are operatively connected with the friction wheel by passing through slots formed on either side of its center, as illustrated in Figs. 2 and 3. The friction wheel which, as shown, engages the under side of the cheese platform, is adapted to be adjusted toward and away from the center of such platform in a manner and for a purpose hereinafter made apparent. It is sufficient for the present to say that the platform is permitted to turn predetermined distances as determined by the degree or amount of turning of the friction wheel whose movement is determined by the set or predetermined adjustment of the indicating or computing devices.

Referring to the indicating or computing devices, the end head 16 which forms a portion thereof is provided with an inwardly projecting finger 24 which extends and sweeps over the outer end of the case 15. This finger, in the normal position of the indicating drum or cylinder, that is, in the zero position thereof, contacts a stationary stop pin 25 arranged on the case 15 in the path of movement of such finger, with the result that after an adjustment of the indicating drum and after the operation or partial rotation of the cheese platform, such drum will return until stopped by the contact finger 24 against the stop pin 25.

The operation of the machine will now be described without taking into account the varying size of the wheel of cheese and the consequent required adjustment of the mechanism necessitated thereby. Assuming for example that a customer has called for two pounds of cheese and that a radial cut has already been made in the wheel of cheese, the salesman or operator first draws the head 16 and the attached cylinder outwardly and longitudinally of the shaft 12 against the tension of the spring 17. This head is moved a distance sufficient to disengage the ratchet surfaces, whereupon the head and cylinder are turned or adjusted in the proper direction until the two pounds indication is exhibited through the sight opening or slot 15ª in the case. Thereupon the salesman permits the reëngagement of the ratchet surfaces, the spring 17 serving to hold them in such engagement. The cylinder is prevented from returning to normal position because of its described connection with the collar 19, tube 22, wheel 23 and platform 2. The platform is normally spring-pressed in one direction by the spring 10 as described but is normally restrained against such movement by the cheese knife, whose blade presses against one side or radial face of the cheese. However, when the salesman lifts the knife upwardly until its blade clears the cheese ready for the next cut, the spring 10 exerts its tension and turns the platform a distance corresponding to or determined by the amount of adjustment of the cylinder, that is to say, the platform will turn upon the friction wheel until the latter is stopped by the return of the cylinder to normal position. The cheese now assumes a different position relative to the knife which, when depressed by the salesman, cuts off a segmental piece or slice of cheese. When the machine is properly adjusted, according to the size of the wheel of cheese as hereinafter described, the piece or slice of cheese, in the above described example, will be found to weigh exactly two pounds. Obviously a piece or slice of cheese of any number of pounds or fractions thereof may be cut off according to the adjustment of the indicating devices, with the result that the cheese platform will turn more or less to present more or less of the cheese to the knife according to the predetermined adjustment.

The indicating cylinder or drum may, if desired, be provided with both weight and price indications and the case 15 may be provided on the margin of the sight opening with figures representing the price per pound as commonly employed in so-called computing scales. For instance as illustrated in Fig. 1 the case 15 may be provided along one edge of its sight opening with the series of figures indicating the price per pound such as the figures 15, 16, 17, 18, 19, 20 and 25 of said Fig. 1. As also shown in said figure of the drawings this edge of the sight opening may also be provided with some word or indication indicating weight such as the abbreviation "lbs." The price-indicating drum or cylinder is provided with circular rows of numbers or figures, one of these rows representing weights and the others price values in the same manner as the computing drum of a scale of the drum type. When the computing mechanism is in normal condition a series of ciphers will be exhibited through the sight opening as shown in Fig. 1 but the drum is adapted to be rotated, in the manner hereinbefore explained, to the desired position of adjustment according to the price of the slice or cut of cheese being sold whereupon the amount or the price of such slice, or the weight, or both, are exposed through the sight opening, and the platform together with the cheese will be permitted to turn the proper distance for such weight or value of slice of cheese. It will be understood that in case the customer should call for a certain value of cheese, say twenty cents' worth thereof, the operator adjusts the cylinder until the number 20 is exhibited through the sight opening at a point opposite the price-per-pound of the particular cheese on the platform. The remainder of the operation is precisely the same as that already described.

In the foregoing description of operations it has been assumed that the wheel of cheese is of a certain size and weight to which the device or machine has been adjusted, but as is well known wheels of cheese vary considerably in weight and size, usually from ten pounds as the smallest to forty pounds as the largest. It is quite obvious that in cutting a predetermined value or weight of cheese the amount of movement of the platform should vary with the weight of the wheel of cheese, the movement being greater with a light wheel of cheese and less with a heavy wheel. Consequently the amount of turning of the platform permitted by the friction wheel must be regulated or controlled according to the size of the particular wheel of cheese on the platform. It will be understood that the movement of the friction wheel is a fixed quantity for the same amount of adjustment of the indicating cylinder and consequently the operating connection between such cylinder and the platform (such connection being in the present instance the friction wheel) must be adjusted according to the weight of the wheel of cheese on the platform. For instance, assuming that the indicating cylinder is adjusted for a two pound slice of cheese and that the largest size of wheel of cheese is on the platform, say a forty pound wheel, the platform should be permitted to turn a less distance than in case the wheel of cheese was of less weight, this being because of the larger diameter and thickness of the larger wheel of cheese. Therefore, to make provision for the conditions presented by the varying sizes of wheels of cheese as above explained, I make arrangement for moving or adjusting the friction wheel radially of the platform, that is, toward or away from its center or axis of rotation, and longitudinally of the shaft 12, inasmuch as a predetermined amount of movement of the friction wheel will impart or permit more or less rotary movement of the platform according to the particular position or adjustment of the friction wheel. For this purpose, the shaft 12 is screw-threaded toward one end to receive an internally screw-threaded hub 23$^a$ of the friction wheel, which hub is spool-shaped in order to move the friction wheel longitudinally of the shaft when the latter is rotated, with the result that the friction wheel will be adjusted radially of the cheese platform according to the particular direction of rotation of the shaft and to an extent determined by the amount of rotation of said shaft. For the purpose of conveniently manipulating the shaft 12 and adjusting the friction wheel with accuracy, I secure thereto at its outer end two wheels or dials 26 and 27, which may be denominated weight dials, the former being a pound dial to indicate pounds (not shown) or other unit of weight, and the latter an ounce dial to indicate ounces (not shown) or fractions of a pound. The dial 26 is graduated in pounds, that is bears on its periphery a series of numbers, preferably 10 to 40, representing the range of weight in pounds of the wheels of cheese, which figures are adapted to be exposed through a sight opening or slot 28$^a$ in the casing 28 fastened to the main frame of the machine According to the present construction as herein illustrated, the pound dial, which is loosely mounted on the shaft 12, carries a gear wheel 29 meshing with a star wheel 30, which latter wheel is adapted to be moved a distance of one tooth for every rotation of the disk 27 through the medium of the pin 31 on such latter wheel.

In practice, the weight of the wheel of cheese being known, say forty pounds for example, the pound dial 26 is turned through the medium of the ounce wheel until the number 40 thereon is exposed through the sight opening, thereby indicating that the parts are adjusted so as to provide for the accurate cutting of a wheel of cheese of that weight, it being understood that in said movement of the weight dial the friction wheel is radially adjusted with respect to the platform. For convenient manipulation, the ounce wheel has a milled flange 27ª extending beyond the surface of the casing 28, as seen in Fig. 1. In the present instance or example, such friction wheel is adjusted radially outward in relation to the platform, with the result that on account of the larger size of the cheese the minimum of movement of the platform is required. In case the cheese should be of less weight than forty pounds, the pound dial is adjusted until it indicates the number corresponding to the known weight of such wheel of cheese, with the result that the friction wheel is adjusted radially of the platform a distance corresponding to the particular movement or adjustment of the pound dial. If, now, the machine is to be adjusted so as to accommodate or take care of a wheel of cheese which does not weigh evenly into pounds, that is, weighs a certain number of pounds and a fraction thereof, as for example twenty pounds and eight ounces, the weight dials, that is the pound and ounce dials, are so adjusted that they indicate through the sight openings said twenty pounds and eight ounces. The ounce dial is turned by the operator until the star wheel turns the pound dial to indicate twenty, and the movement of the ounce dial is continued until the figure 8 is exposed through the sight opening.

I claim:

1. A cheese cutter comprising a platform adapted to support the cheese, and mounted to rotate, a knife, means tending to turn the platform, and computing mechanism for controlling the degree of movement of the platform; substantially as described.

2. A cheese cutter comprising a platform adapted to support the cheese and mounted to rotate, a knife, a spring coöperating with the platform to turn the latter in one direction, and computing mechanism for controlling the degree of movement thereof according to the desired weight or value of cheese desired; substantially as described.

3. A cheese cutter comprising a platform adapted to support the cheese and mounted to rotate, said platform being normally under tension tending to rotate it, a knife, and computing mechanism adapted to be set or adjusted to a position indicating the desired weight or value of the slice of cheese and arranged to govern the degree of movement of the platform according to the particular adjustment of said computing mechanism; substantially as described.

4. A cheese cutter comprising a platform adapted to support the cheese and mounted to rotate, a knife, tension mechanism acting to turn the platform in one direction, and means adjustable to correspond with the desired weight or value of the slice of cheese to be cut and arranged to limit the movement of the platform at a certain point according to said weight or value; substantially as described.

5. A cheese cutter comprising a platform adapted to support the cheese and mounted to rotate, a knife, price computing mechanism arranged to be adjusted according to the desired weight of the slice of cheese to be cut and having provisions for showing simultaneously a series of different computations in association with a series of varying price-per-unit-of-weight indicia, and a wheel forming an operative connection between said mechanism and platform for controlling the degree of movement of the latter; substantially as described.

6. A cheese cutter comprising a platform adapted to support the cheese and mounted to rotate, a knife, price computing mechanism arranged to be adjusted according to the desired weight of the slice of cheese to be cut and having provisions for showing simultaneously a series of different computations in association with a series of varying price-per-unit-of-weight indicia, and a wheel operatively connected with said mechanism and engaging a surface of the platform to control the movement of the latter; substantially as described.

7. A cheese cutter comprising a platform adapted to support the cheese and mounted to rotate, a knife, price computing mechanism arranged to be adjusted according to the desired weight of the slice of cheese to be cut and having provisions for showing simultaneously a series of different computations in association with a series of varying price-per-unit-of-weight indicia, and a wheel operatively connected with said mechanism and having frictional contact with a surface of the platform to control the latter's movement; substantially as described.

8. A cheese cutter comprising a platform adapted to support the cheese and mounted to rotate, a knife, price computing mechanism arranged to be adjusted according to the desired weight of the slice of cheese to be cut and having provisions for showing simultaneously a series of different computations in association with a series of varying price-per-unit-of-weight indicia, and a friction wheel operatively connected with said mechanism and having frictional contact with the under surface of the platform to control the latter's movement; substantially as described.

9. A cheese cutter comprising a platform adapted to support the cheese and mounted to rotate, a knife, means constantly tending to turn the platform in one direction, computing mechanism arranged to be adjusted according to the desired weight or value of the slice of cheese to be cut, and a friction wheel operatively connected with said mechanism and having frictional contact with the platform to control the amount of the latter's movement according to any adjustment of such mechanism; substantially as described.

10. A cheese cutter comprising a platform adapted to support the cheese and mounted to rotate, a knife, means tending to turn the platform in one direction, a rotatable member operatively connected with the platform, and means for limiting the movements of such member to variable degrees according to the weight or value of the slice of cheese desired; substantially as described.

11. A cheese cutter comprising a platform adapted to support the cheese and mounted to rotate, a knife, means tending to turn the platform in one direction, a rotatable member, a wheel carried by such member and arranged to coöperate with the platform, and adjustable means for varying the degree of movement of said member according to the weight or value of the slice of cheese desired; substantially as described.

12. A cheese cutter comprising a platform adapted to support the cheese and mounted to rotate, a knife, a rotatable member having operative connection with the platform, and an adjustable member arranged to be positively connected to said rotatable member in different relative positions and to limit the movement of the latter and of the platform according to its predetermined adjustment which corresponds with the weight or value of the slice of cheese desired, said adjustable member being moved by said rotatable member; substantially as described.

13. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, and an indicating device carried by said head; substantially as described.

14. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, and an indicating cylinder carried by and adjustable with said head; substantially as described.

15. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, and an indicating device for indicating both weight and values, said device being carried by and adjustable with said head; substantially as described.

16. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, an indicating device carried by and adjustable with said head, and means for stopping said head at a normal or zero position of the indicating device; substantially as described.

17. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, an indicating device carried by and adjustable with said head, and a fixed pin for stopping said head at a normal or zero position of the indicating device; substantially as described.

18. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, an indicating device carried by and adjustable with said head, a stationary case having a sight opening for exposing the indicating device, and a stop pin on the case to stop the adjustable head at the normal or zero position of the indicating device; substantially as described.

19. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, an indicating device carried by and adjustable with said head and provided with a stop finger, a stationary case having a sight opening, and a stop pin on the case to coöperate with the stop finger and thereby normally hold the indicating device to normal position; substantially as described.

20. A cheese cutter comprising a platform adapted to support the cheese and mounted to rotate, a knife, a rotatable member having operative connection with the platform, an adjustable head arranged to operatively engage said member in different adjusted positions and to be moved therewith to limit the movement of the rotatable member and of the platform accordingly, said head being disengageable from said rotatable member, means for normally holding said head and member in operative relation, and an indicating device carried by and adjustable with the head; substantially as described.

21. A cheese cutter comprising a platform adapted to support the cheese and mounted to rotate, a knife, a rotatable member having operative connection with the platform, an adjustable head arranged to operatively engage said member in different adjusted positions and to be moved therewith to limit the movement of the rotatable member and of the platform accordingly, said head being disengageable from said rotatable member, means for normally holding said head and member in operative relation with a yielding pressure, and an indicating device carried by and adjustable with the head; substantially as described.

22. A cheese cutter comprising a platform adapted to support the cheese and mounted to rotate, a knife, a rotatable member having operative connection with the platform, an adjustable head arranged to operatively engage said member in different adjusted positions and to be moved therewith to limit the movement of the rotatable member and of the platform accordingly, said head being disengageable from said rotatable member, said head and member having engaging surfaces, and means for normally holding such surfaces in engagement with a yielding pressure; substantially as described.

23. A cheese cutter comprising a platform adapted to support the cheese and mounted to rotate, a knife, a rotatable member having operative connection with the platform, an adjustable head arranged to operatively engage said member in different adjusted positions and to be moved therewith to limit the movement of the rotatable member and of the platform accordingly, said head and member having ratchet surfaces and being disengageable from each other, and a spring for normally holding such surfaces in engagement; substantially as described.

24. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, a shaft on which said head and member are mounted to turn, and indicating mechanism carried by and adjustable with said head; substantially as described.

25. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, means for normally holding said head and member in operative relation, a shaft on which such head and member are mounted to turn and on which the head is movable longitudinally to disengage it from said member; substantially as described.

26. A cheese cutter comprising a platform adapted to support the cheese and mounted to rotate, a knife, a rotatable member having operative connection with the platform, an adjustable head arranged to operatively engage said member in different adjusted positions and to limit the movement of the latter and of the platform accordingly, a spring for normally holding said head in operative relation with said member, a shaft on which such head and member are mounted to turn and on which the head is movable longitudinally to disengage it from said member, and an indicating drum or cylinder connected with said head; substantially as described.

27. A cheese cutter comprising a platform adapted to support the cheese and mounted to rotate, a knife, a wheel controlling the degree of movement of the platform, a rotatable collar or sleeve operatively connected with the wheel, and a head adjustable with relation to said collar according to the weight or value of the piece of cheese desired; substantially as described.

28. A cheese cutter comprising a platform adapted to support the cheese and mounted to rotate, a knife, a wheel controlling the degree of movement of the platform, a rotatable collar or sleeve operatively connected with the wheel, and a head adjustable with relation to said collar according to the weight or value of the piece of cheese desired, said head and collar having corresponding surfaces normally held in engagement; substantially as described.

29. A cheese cutter comprising a platform adapted to support the cheese and mounted to rotate, a knife, a wheel controlling the degree of movement of the platform, a rotatable collar or sleeve, a tube connecting the latter with said wheel, and a head normally spring-pressed into engagement with said collar but adjustable in relation thereto; substantially as described.

30. A cheese cutter comprising a base, a platform adapted to support the cheese and mounted to rotate thereon, a knife pivoted on said base and arranged to cut radially of the platform, means tending to rotate the platform, and adjustable indicating mechanism for controlling the degrees of movement of the platform; substantially as described.

31. A cheese cutter comprising a base, a platform adapted to support the cheese and mounted to rotate thereon, a knife pivoted on said base and arranged to cut radially of the platform, said base having a bearing 4 and the platform having a spindle whose end is received by such bearing, means tending to rotate the platform, and adjustable indicating mechanism for controlling the degrees of movement of the platform; substantially as described.

32. A cheese cutter comprising a base, a platform adapted to support the cheese and mounted to rotate thereon, a knife pivoted on said base and arranged to cut radially of the platform, a spring tending to rotate the platform, and adjustable indicating mechanism for controlling the degrees of movement of the platform; substantially as described.

33. A cheese cutter comprising a base, a platform adapted to support the cheese and mounted to rotate thereon, a knife pivoted on said base and arranged to cut radially of the platform, said platform having a depending spindle bearing in said base, a spring connected with the spindle and thereby tending to rotate the platform, and adjustable mechanism for controlling the degrees of movement of the platform; substantially as described.

34. A cheese cutter comprising a base, a platform adapted to support the cheese and mounted to rotate thereon, a knife pivoted on said base and arranged to cut radially of the platform, said platform having a depending spindle, a spring connected with the spindle and tending to rotate the platform, a case 5 formed in the base and constituting a case for the spring and a bearing for the spindle, and adjustable mechanism for controlling the degrees of movement of the platform; substantially as described.

35. A cheese cutter comprising a platform adapted to support the cheese and mounted to rotate, a knife, computing mechanism arranged to be adjusted for different weights or values of cuts of cheese for controlling the degree of movement of the platform, and an operating connection between said platform and computing mechanism, a single adjustment of the latter serving to indicate both weight and value at varying prices per unit of weight; substantially as described.

36. A cheese cutter comprising a platform adapted to support the cheese and mounted to rotate, a knife, computing mechanism having both weight and price indicia and controlling the degree of movement of the platform and adapted to be adjusted according to the desired weight or value of the slice of cheese to be cut, and means for varying the degree of movement according to the weight of the particular wheel of cheese, a single movement of the platform serving to measure off any desired amount of cheese and the price indicia serving to denote values at varying prices per pound; substantially as described.

37. A cheese cutter comprising a platform adapted to support the cheese and mounted to rotate, a knife, computing mechanism having weight and price indicia and controlling the degree of movement of the platform and adapted to be adjusted according to the desired weight or value of the slice of cheese to be cut, and means for varying the degree of movement of the platform with the same degree of adjustment of said mechanism, a single movement of the platform serving to measure off any desired amount of cheese and the price indicia serving to denote values at varying prices per pound; substantially as described.

38. A cheese cutter comprising a platform adapted to support the cheese and mounted to rotate, a fixed stop limiting rotation thereof in one direction, a knife, mechanism variously adjustable with reference to said fixed stop for controlling the degree of movement of the platform, and an adjustable wheel forming the operating connection between said platform and mechanism; substantially as described.

39. A cheese cutter comprising a platform adapted to support the cheese and mounted to rotate, a knife, and mechanism controlling the degree of movement of the platform, including a wheel operatively connected with said mechanism and having frictional contact with the platform, said wheel being adjustable radially of the platform; substantially as described.

40. A cheese cutter comprising a platform adapted to support the cheese and mounted to rotate, a fixed stop limiting rotation thereof in one direction, a knife, mechanism variously adjustable with reference to said fixed stop for controlling the degree of movement of the platform, a wheel forming the operating connection between said platform and mechanism, and means for adjusting said wheel radially of the platform according to the full weight of the wheel of cheese on the platform; substantially as described.

41. A cheese cutter comprising a platform adapted to support the cheese and mounted to rotate, a knife, mechanism controlling the degree of movement of the platform, a wheel forming the operating connection between said platform and mechanism, and means for adjusting said wheel radially of the platform according to the full weight of the wheel of cheese on the platform, said means comprising a rotatable shaft on which the wheel is mounted and by whose rotation the wheel is adjustable longitudinally of the shaft; substantially as described.

42. A cheese cutter comprising a platform adapted to support the cheese and mounted to rotate, a knife, mechanism controlling the degree of movement of the platform, a wheel forming the operating connection between said platform and mechanism, and means for adjusting said wheel radially of the platform according to the full weight of the wheel of cheese on the platform, said means comprising a rotatable screw shaft, and a screw-threaded hub on said shaft, said wheel being mounted to rotate on said hub; substantially as described.

43. A cheese cutter comprising a platform adapted to support the cheese and mounted to rotate, a knife, mechanism controlling the degree of movement of the platform, a wheel forming the operating connection between said platform and mechanism, and means for adjusting said wheel radially of the platform according to the full weight of the wheel of cheese on the platform, said means comprising a rotatable shaft on which the wheel is mounted for rotation and for longitudinal adjustment, and an indicating dial connected to said shaft; substantially as described.

44. A cheese cutter comprising a platform adapted to support the cheese and mounted to rotate, a knife, mechanism controlling the degree of movement of the platform, a wheel forming the operating connection between said platform and mechanism, and means for adjusting said wheel radially of the platform according to the full weight of the wheel of cheese on the platform, said means comprising a rotatable screw-shaft on which the wheel is mounted, and a dial thereon bearing numbers and arranged to be adjusted until it indicates the full weight of the cheese on the platform; substantially as described.

45. A cheese cutter comprising a platform adapted to support the cheese and mounted to rotate, a knife, mechanism controlling the degree of movement of the platform, a wheel forming the operating connection between said platform and mechanism, and means for adjusting said wheel radially of the platform according to the full weight of the wheel of cheese on the platform, said means comprising a rotatable shaft adapted to adjust the wheel radially of the platform, a dial connected to said shaft, and a manually operated member operatively connected with said dial; substantially as described.

46. A cheese cutter comprising a platform adapted to support the cheese and mounted to rotate, a knife, mechanism controlling the degree of movement of the platform, a wheel forming the operating connection between said platform and mechanism, and means for adjusting said wheel radially of the platform according to the full weight of the wheel of cheese on the platform, said means comprising a rotatable shaft adapted to adjust the wheel radially of the platform, a dial connected to said shaft, and a second dial operatively connected with the first dial and arranged to be manipulated by the operator; substantially as described.

47. A cheese cutter comprising a platform adapted to support the cheese and mounted to rotate, a knife, mechanism controlling the degree of movement of the platform, a wheel forming the operating connection between said platform and mechanism, and means for adjusting said wheel radially of the platform according to the full weight of the wheel of cheese on the platform, said means comprising a rotatable shaft adapted to adjust the wheel radially of the platform, a dial connected to said shaft, said dial having gear teeth, a star wheel 30 coöperating therewith, and a second dial having a pin 25 for actuating the star wheel; substantially as described.

48. A cheese cutter comprising a rotatable platform adapted to support the cheese, a knife for cutting the cheese, computing mechanism, and automatic means for rotating the platform according to the particular weight or value indicated by the computing mechanism.

49. A cheese cutter comprising a rotatable platform adapted to support the cheese and normally under a tension tending to rotate it, a knife for cutting the cheese and for normally holding the same and the platform against rotation, and computing mechanism controlling the degree of movement of the platform; substantially as described.

ALLEN DE VILBISS, Jr.

Witnesses:
F. S. JOHNSON,
J. H. MUNRO.